United States Patent
Inoue

(10) Patent No.: US 11,308,983 B2
(45) Date of Patent: Apr. 19, 2022

(54) PLATE MATERIAL, PLATE MATERIAL TEARING METHOD, AND SUSPENSION

(71) Applicant: NHK SPRING CO., LTD., Yokohama (JP)

(72) Inventor: Masaru Inoue, Aiko-gun (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/101,004

(22) Filed: Nov. 23, 2020

(65) Prior Publication Data

US 2021/0174827 A1    Jun. 10, 2021

(30) Foreign Application Priority Data

Dec. 10, 2019 (JP) .............................. JP2019-222871

(51) Int. Cl.
  *G11B 5/48*    (2006.01)
(52) U.S. Cl.
  CPC .......... *G11B 5/4833* (2013.01); *G11B 5/4826* (2013.01)
(58) Field of Classification Search
  CPC ............................ G11B 5/4833; G11B 5/4826
  See application file for complete search history.

(56) References Cited

U.S. PATENT DOCUMENTS

| | | | | |
|---|---|---|---|---|
| 3,580,040 A * | 5/1971 | Lang | ..................... | B21D 28/265 72/324 |
| 6,373,709 B1 * | 4/2002 | Hino | ..................... | B82Y 10/00 174/535 |
| 7,075,754 B2 * | 7/2006 | Motonishi | ............ | G11B 5/4826 360/245.3 |
| 8,827,130 B2 | 9/2014 | Inoue | | |
| 2003/0161073 A1 | 8/2003 | Horie et al. | | |
| 2004/0250417 A1 * | 12/2004 | Arneson | .............. | G06K 19/077 29/832 |
| 2005/0209797 A1 * | 9/2005 | Anderson | ............ | G11B 5/4826 702/57 |
| 2006/0180444 A1 * | 8/2006 | Young | .................. | H05K 1/0259 200/61.8 |
| 2008/0075918 A1 * | 3/2008 | Ooyabu | ............... | H05K 1/0269 428/138 |
| 2009/0195933 A1 * | 8/2009 | Kido | .................... | H05K 3/3442 360/240 |

(Continued)

FOREIGN PATENT DOCUMENTS

| | | |
|---|---|---|
| CN | 102347050 A | 2/2012 |
| JP | 2012027993 A | 2/2012 |

OTHER PUBLICATIONS

Chinese Office Action (and English language translation thereof) dated Dec. 21, 2021, issued in counterpart Chinese Application No. 202011290861.X.

*Primary Examiner* — Brian E Miller
(74) *Attorney, Agent, or Firm* — Holtz, Holtz & Volek PC

(57) ABSTRACT

A plate material has a first portion, a second portion, and a fracture portion connecting the first portion and the second portion, and is separated into the first portion and the second portion by tearing the fracture portion. The first portion and the second portion are arranged in a first direction. The fracture portion has thin portions arranged in a second direction crossing the first direction. Widths in the second direction of the thin portions are different from each other.

8 Claims, 8 Drawing Sheets

(56) References Cited

U.S. PATENT DOCUMENTS

| | | | | |
|---|---|---|---|---|
| 2012/0027977 A1* | 2/2012 | Inoue | ............... | B21D 28/16 |
| | | | | 428/43 |
| 2012/0205037 A1* | 8/2012 | Kitzer | ............... | A61F 13/15723 |
| | | | | 156/229 |
| 2014/0153373 A1* | 6/2014 | Fujimura | ............... | G11B 5/486 |
| | | | | 369/13.32 |
| 2018/0288883 A1* | 10/2018 | Sakakura | ............. | H05K 3/3431 |
| 2021/0174827 A1* | 6/2021 | Inoue | ................. | G11B 5/4826 |

* cited by examiner

PLATE MATERIAL, PLATE MATERIAL TEARING METHOD, AND SUSPENSION

CROSS-REFERENCE TO RELATED APPLICATIONS

This application is based upon and claims the benefit of priority from prior Japanese Patent Application No. 2019-222871, filed Dec. 10, 2019, the entire contents of which are incorporated herein by reference.

BACKGROUND OF THE INVENTION

1. Field of the Invention

The present invention relates to a plate material used for a suspension of, for example, a disk drive, a plate material tearing method of tearing the plate material, and a suspension manufactured by tearing the plate material.

2. Description of the Related Art

A hard disk drive (HDD) is used in an information processing apparatus such as a personal computer. The hard disk drive includes a magnetic disk which rotates about a spindle, a carriage which turns about a pivot shaft, and the like. The carriage has an actuator arm, and is turned in a track width direction of the disk about the pivot shaft by a positioning motor such as a voice coil motor.

A disk drive suspension (hereinafter referred to simply as a suspension) is attached to the actuator arm. The suspension includes a base plate, a load beam coupled to the base plate, a flexure arranged overlapping the load beam, and the like. In a gimbal portion formed close to a distal end of the flexure, a slider constituting a magnetic head is provided. In the slider, an element (transducer) for reading data from the disk and writing data to the disk is provided. The load beam, the flexure, the slider and the like constitute a head gimbal assembly.

During the manufacturing of the suspension, from the perspective of efficiency, a chain blank where a plurality of suspensions are coupled together by a frame is manufactured. The frame is integrally connected to a part of the suspension, for example, the load beam. After that, the individual suspensions in the chain blank are separated from the frame.

During the separation of the suspension from the frame, a method of sandwiching a part of the suspension between an upper die and a lower die, pressing the frame by a punch, and applying a shear force to a connection portion of these two may be used. However, in order to realize this separation method, high accuracy is required for a clearance between the punch and the lower die, or the like, and a cutting apparatus costs high. In addition, burrs and particles may occur.

Therefore, in JP 2012-027993 A, a method of providing an easy-to-tear portion where an opening and a thin portion are alternately arranged in a cut portion of the frame and the load beam, and cutting the easy-to-tear portion using a tensile force in an in-plane direction is proposed. According to this method, since high accuracy is not necessarily required for the clearance, the cost of a tearing apparatus can be suppressed. In addition, occurrence of burrs and particles can be suppressed.

Recently, processing with higher accuracy has been required in the suspension. When the cut portion is relatively thick, even if the above easy-to-tear portion is provided, strong vibration still occurs during tearing. This vibration may have various negative impacts on the suspension after separation.

On the other hand, when all the thin portions of the easy-to-tear portion are made thin, vibration during tearing can be suppressed. In this case, however, the strength to support the suspension of the frame is reduced, and the vibration of the suspension during the transportation of the chain blank is increased. Since the suspension may be deformed by this vibration, this vibration causes yield reduction.

As described above, the method of separating the suspension from the frame have various problems which can be improved. Similar problems may also arise during separation of a plate material used for a product other than the suspension.

BRIEF SUMMARY OF THE INVENTION

An object of the present invention is to provide a plate material and a plate material tearing method which can realize tearing of a fracture portion with excellent quality and to provide a suspension which can realize improvement in yield.

A plate material according to one embodiment has a first portion, a second portion, and a fracture portion connecting the first portion and the second portion, and is separated into the first portion and the second portion by tearing the fracture portion. The first portion and the second portion are arranged in a first direction. The fracture portion has a plurality of thin portions arranged in a second direction crossing the first direction. Furthermore, widths in the second direction of the thin portions are different from each other.

The fracture portion may have a first thin portion, a second thin portion and a third thin portion arranged in the second direction. In this case, a width in the second direction increases in an order of the first thin portion, the second thin portion and the third thin portion. As another example, the width in the second direction of the second thin portion may be less than those of the first thin portion and the third thin portion. As yet another example, the width in the second direction of the second thin portion may be greater than those of the first thin portion and the third thin portion.

The fracture portion may have a plurality of openings provided between the thin portions adjacent to each other, respectively, and widths in the second direction of the openings may be the same.

The first portion may be a part of a suspension supporting an element for writing data to a disk provided in a disk drive and reading data from the disk. In this case, the second portion may be a frame forming a chain blank by coupling a plurality of the suspensions together.

In a plate material tearing method according to one embodiment, the first portion is arranged between a pad retreatable against an urging force and a punch, the second portion is sandwiched between an upper die and a lower die, and the fracture portion is fractured by applying a tensile force in the first direction to the fracture portion by pressing the pad by the punch.

A suspension according to one embodiment is configured to support an element for writing data to a disk provided in a disk drive and reading data from the disk, and includes a base plate, a load beam including a rigid portion and a pair of spring portions connecting the rigid portion and the base plate, and a flexure connected to the load beam and having a tongue for mounting the element. The pair of spring portions have a first end side and a second end side in a width direction of the suspension, respectively. The first end side and the second end side each have a plurality of thin portions arranged in a longitudinal direction of the suspension, and a concave portion between the thin portions adjacent to each other. Widths in the longitudinal direction of the thin portions are different from each other.

According to the plate material and the plate material tearing method of the above configuration, the fracture portion can be torn with excellent quality. In addition, according to the suspension of the above configuration, the first end side and the second end side can be manufactured as the fracture portion, and therefore the yield can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments will be described with reference to the accompanying drawings.

In the embodiments, a suspension of a disk drive (HDD), a plate material used during its manufacturing, and a method of tearing the plate material will be illustrated. Note that a plate material and its tearing method having a similar configuration to that of the embodiments can be applied to a component, a member or an apparatus other than a suspension and its manufacturing process.

First Embodiment

Figure 1:
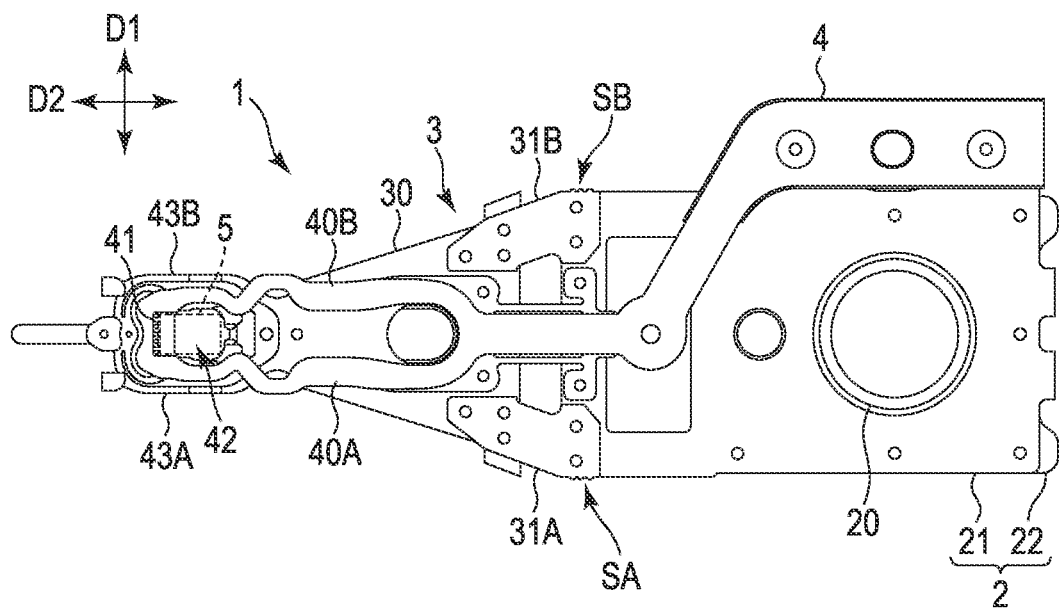
FIG. 1 is a schematic plan view of a suspension according to the first embodiment.

FIG. 1 is a schematic plan view of a suspension 1 according to the first embodiment. The suspension 1 includes a base plate 2, a load beam 3 and a flexure 4. In the following explanation, a first direction D1 and a second direction D2 orthogonal to each other as illustrated will be defined. The first direction D1 corresponds to a width direction of the suspension 1, and the second direction D2 corresponds to a longitudinal direction of the suspension 1.

In the base plate 2, a boss portion 20 for attaching the suspension 1 to an arm provided in a carriage of a disk drive is provided. In the example of FIG. 1, the base plate 2 includes a first plate 21 and a second plate 22 superposed on the first plate 21. The first plate 21 and the second plate 22 are formed of, for example, a metal material such as stainless steel, and are coupled together by spot welding. However, the first plate 21 and the second plate 22 may be integrally formed from the beginning. The thicknesses of the first plate 21 and the second plate 22 are, for example, 150 μm but are not limited to this.

The load beam 3 includes a rigid portion 30, a first spring portion 31A and a second spring portion 31B. The rigid portion 30 has a shape tapered toward a distal end (leftward in the drawing). The rigid portion 30 and the spring portions 31A and 31B are formed of, for example, a metal material such as stainless steel. The first spring portion 31A is coupled to the rigid portion 30 and the first plate 21 by, for example, spot welding, respectively, at one end of the suspension 1 in the first direction D1. The second spring portion 31B is coupled to the rigid portion 30 and the first plate 21 by, for example, spot welding, respectively, at the other end of the suspension 1 in the first direction D1. Note that the rigid portion 30, the first spring portion 31A and the second spring portion 31B may be integrally formed from the beginning. In this structure, the load beam 3 is elastically supported with respect to the base plate 2 by the spring portions 31A and 31B. The thickness of the rigid portion 30 is, for example, 30 μm but is not limited to this example.

The flexure 4 is arranged along the base plate 2 and the load beam 3, and is coupled to the base plate 2 and the load beam 3 by spot welding. The flexure 4 has a multilayer stack structure including, for example, a metal layer of stainless steel or the like, a copper line for wiring, and an insulating layer of polyimide or the like. The thickness of the metal layer of the flexure 4 is, for example, 20 μm but is not limited to this example.

At a position overlapping the load beam 3, the flexure 4 includes a pair of wiring portions 40A and 40B arranged in the first direction D1. In an end portion of the wiring portions 40A and 40B on a distal end side (leftward in the drawing), a plurality of terminals 41 arranged in the first direction D1 are provided. In addition, the flexure 4 has a tongue 42 close to the terminals 41. The tongue 42 is provided with a slider 5 constituting a magnetic head. The slider 5 includes an element (transducer) for reading data from a disk and writing data to the disk, and is electrically connected to the terminals 41.

The flexure 4 further includes a pair of outriggers 43A and 43B located respectively on both outer sides of the tongue 42 in the first direction D1. The tongue 42, the outriggers 43A and 43B and the like constitute a gimbal portion.

The load beam 3 has a first end side SA at one end in the first direction D1 and a second end side SB at the other end in the first direction D1. In the present embodiment, the first end side SA and the second end side SB are parts of the spring portions 31A and 31B, respectively, and extend in the second direction D2.

Figure 2:
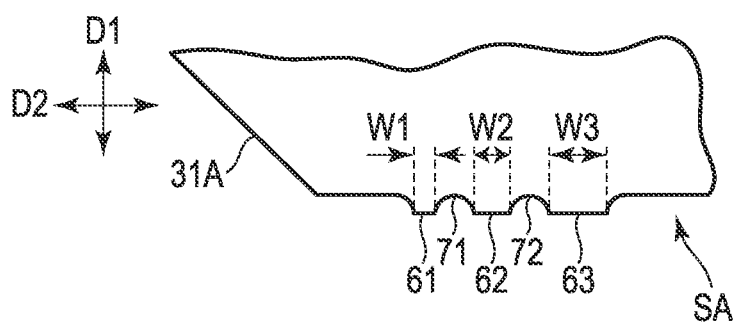
FIG. 2 is an enlarged schematic plan view of a spring portion close to an end side.

FIG. 2 is an enlarged schematic plan view of the first spring portion 31A close to the first end side SA. The first end side SA has a first thin portion 61, a second thin portion 62 and a third thin portion 63 which project in the first direction D1. In addition, the first end side SA has a first concave portion 71 between the first thin portion 61 and the second thin portion 62, and a second concave portion 72 between the second thin portion 62 and the third thin portion 63.

The thin portions 61 to 63 are arranged in order in the second direction D2. In the present embodiment, the first thin portion 61 has a width W1 in the second direction D2, the second thin portion 62 has a width W2 greater than the width W1 in the second direction D2, and the third thin portion 63 has a width W3 greater than the width W2 in the second direction D2. The widths W1 to W3 are, for example, the widths at respective distal ends of the thin portions 61 to 63. As another example, the widths W1 to W3 may be defined as the widths in respective middle portions of the thin portions 61 to 63 or the average values of the widths from respective proximal ends to respective distal ends of the thin portions 61 to 63. In the present embodiment, the widths W1 to W3 are in a range of greater than or equal to twice the thickness of the first spring portion 31A but less than or equal to four times the thickness of the first spring portion 31A.

In the example of FIG. 2, the widths in the second direction D2 of the concave portions 71 and 72 are the same. However, the widths of the concave portions 71 and 72 may be different from each other. For example, the widths of the concave portions 71 and 72 are greater than or equal to the width W1 but less than or equal to the width W3.

Since the shape of the second spring portion 31B close to the second end side SB is similar to the example of FIG. 2, explanation will be omitted. Note that the number of thin portions provided in each of the end sides SA and SB is not limited to three but may be two or greater than or equal to four.

Next, an example of a manufacturing method of the suspension 1 will be explained. During the manufacturing of the suspension 1, a chain blank where the suspensions 1 are coupled together is manufactured.

Figure 3:
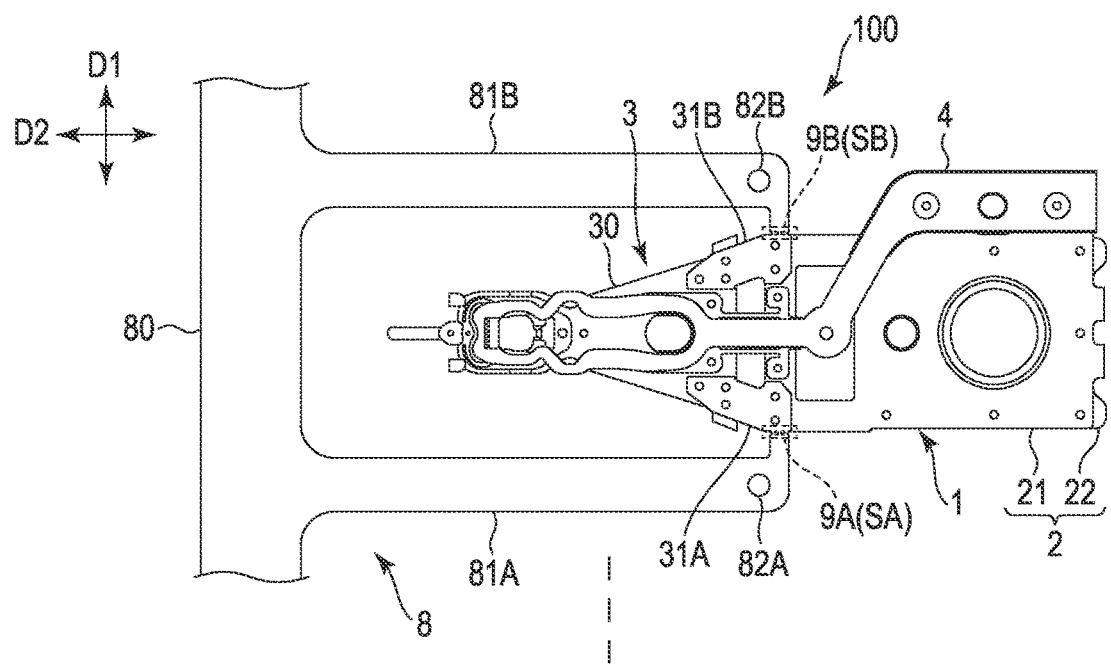
FIG. 3 is a schematic plan view of a chain blank according to the first embodiment.
Figure 4:
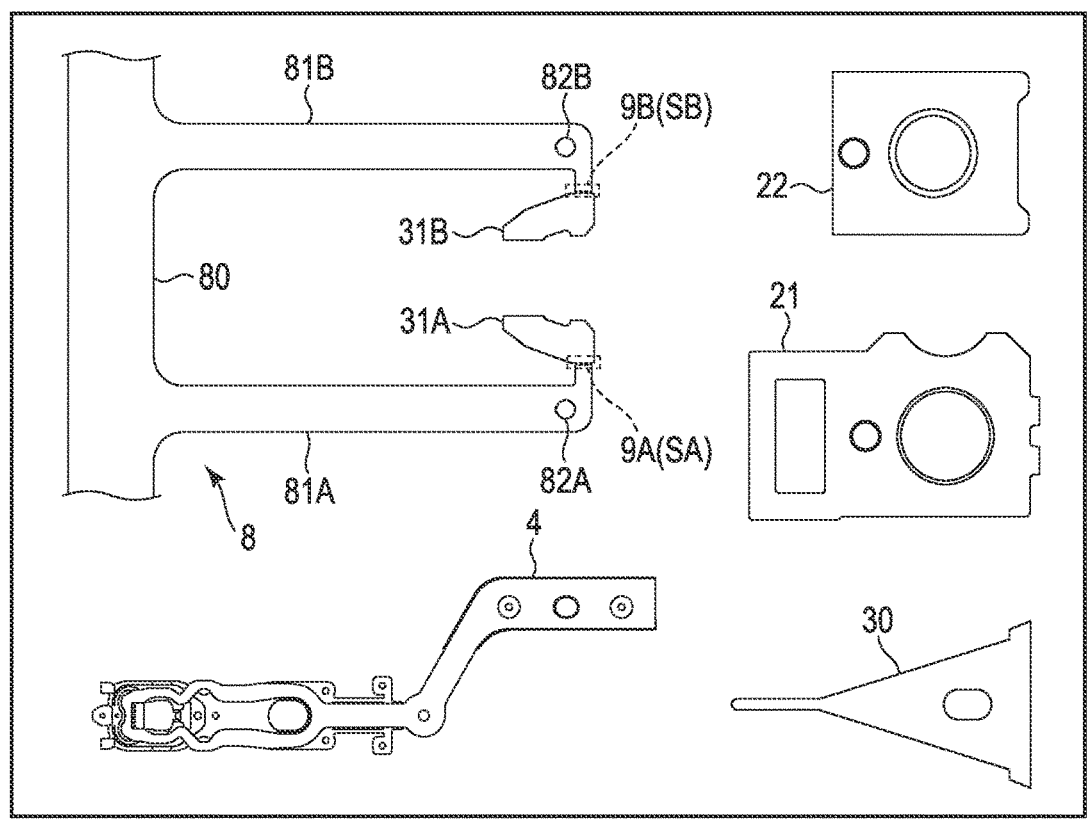
FIG. 4 is a schematic exploded diagram of elements constituting the chain blank shown in FIG. 3.

FIG. 3 is a schematic plan view of a chain blank 100 according to the present embodiment. FIG. 4 is a schematic exploded diagram of elements constituting the chain blank 100.

The chain blank 100 includes a frame 8 in addition to the respective elements of the suspension 1 which are also shown in FIG. 1. The frame 8 includes a coupling portion 80 extending in the first direction D1, and a first arm 81A and a second arm 81B extending in the second direction D2 from the coupling portion 80. The frame 8 further includes pin holes 82A and 82B for fixing the position of the frame 8 in a tearing process which will be described later. In the example of FIGS. 3 and 4, the pin holes 82A and 82B are provided close to distal ends of the arms 81A and 81B, respectively.

The suspension 1 is arranged between the arms 81A and 81B. The first arm 81A is connected to the first spring portion 31A in a first fracture portion 9A (first end side SA). The second arm 81B is connected to the second spring portion 31B in a second fracture portion 9B (second end side SB). The fracture portions 9A and 9B can be referred to also as easy-to-tear portions. The frame 8 and the spring portions 31A and 31B are integrally formed using a metal material such as stainless steel.

The chain blank 100 includes a plurality of sets of the arms 81A and 81B shown in FIG. 3 and the suspension 1 supported by them. These sets are arranged at intervals in the first direction D1, for example.

Figure 5:
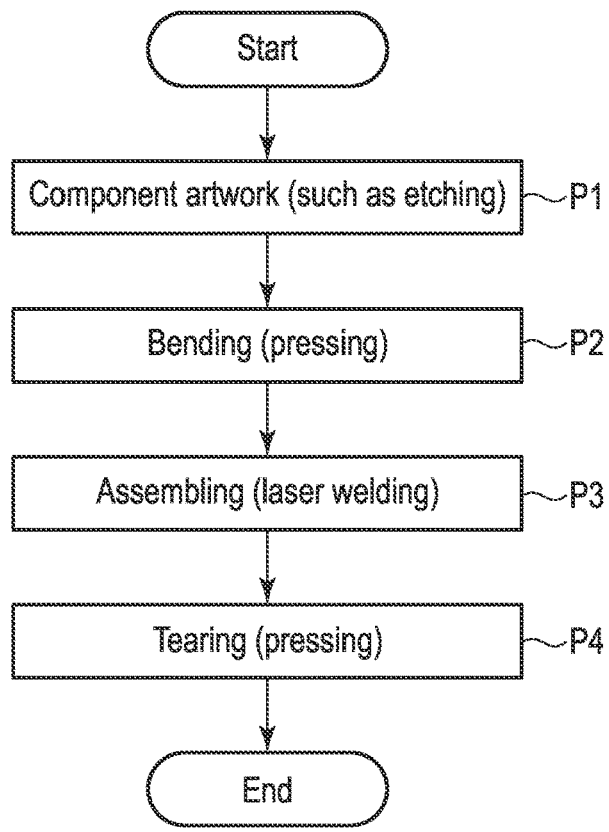
FIG. 5 is a flowchart showing an example of a manufacturing process of the suspension.

FIG. 5 is a flowchart showing an example of a manufacturing process of the suspension 1. The suspension 1 is manufactured through a component artwork process P1, a bending process P2, an assembling process P3 and a tearing process P4. The tearing process P4 can be referred to also as a cutting process or a separation process.

In the component artwork process P1, those of the elements shown in FIG. 4 which are made of metal are formed by punching, etching or the like to a plate which is to be their material.

In the bending process P2, those of the elements shown in FIG. 4 which require bending are bent by an appropriate method. In the process P2, for example, working for forming a dimple which supports the slider with respect to the rigid portion 30 is included.

In the assembling process P3, the elements shown in FIG. 4 are assembled by, for example, spot welding using a laser. In the process P3, welding of the first plate 21 and the second plate 22, welding of the first plate 21 and the spring portions 31A and 31B, welding of the rigid portion 30 and the spring portions 31A and 31B, welding of the flexure 4 and the rigid portion 30, and the like are included.

In the tearing process P4, the suspension 1 is separated from the frame 8 by tearing the fracture portions 9A and 9B shown in FIGS. 3 and 4 by a tearing apparatus 200 which will be described later.

Figure 6:
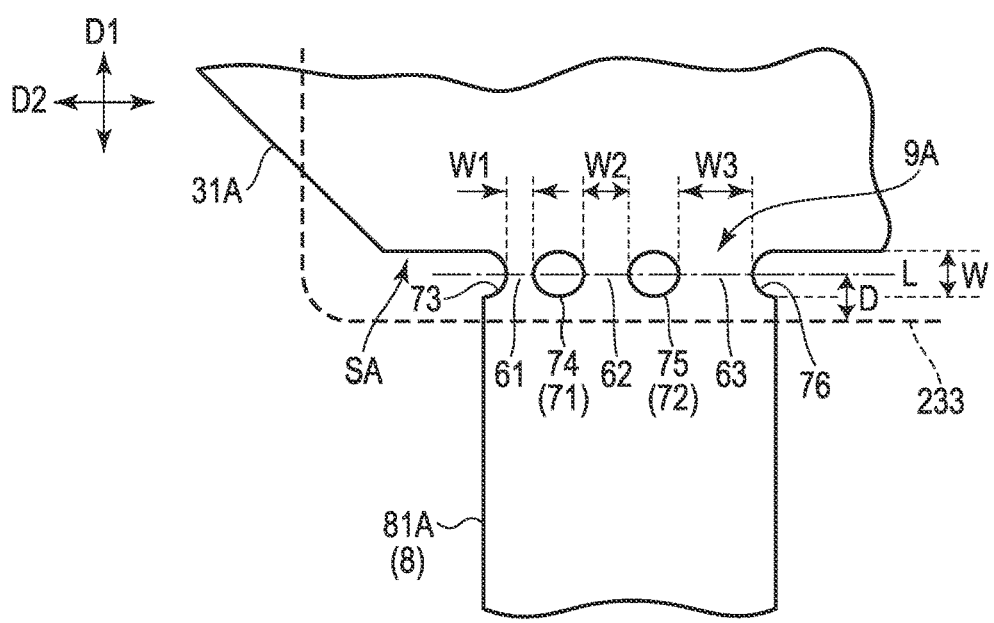
FIG. 6 is a schematic plan view of a fracture portion in the first embodiment.

FIG. 6 is a schematic plan view of the first fracture portion 9A in the present embodiment. In the first fracture portion 9A, the first thin portion 61, the second thin portion 62 and the third thin portion 63 which are also shown in FIG. 2 are provided. In the example of FIG. 6, these thin portions 61 to 63 are connected to the first spring portion 31A and the first arm 81A.

The first thin portion 61 is located between a first notch 73 which is recessed in the second direction D2 at the boundary between the first arm 81 and the first spring portion 31A and a first opening 74 which is adjacent to the first notch 73. The second thin portion 62 is located between the first opening 74 and a second opening 75 which is adjacent to the first opening 74. The third thin portion 63 is located between the second opening 75 and a second notch 76 which is recessed in the second direction D2 at the boundary between the first arm 81A and the first spring portion 31A. This first fracture portion 9A can be formed by, for example, etching or pressing.

The first fracture portion 9A is torn along, for example, a fracture line L shown by a dashed dotted line. After tearing, parts of the thin portions 61 to 63 remaining on a first spring portion 31A side form the thin portions 61 to 63 projecting from the first end side SA shown in FIG. 2, respectively. In addition, parts of circumferential edges of the openings 74 and 75 remaining on the first spring portion 31A side form the concave portions 71 and 72 shown in FIG. 2, respectively.

The magnitude relationship of the widths W1 to W3 of the thin portions 61 to 63 are as described above. However, since the thin portions 61 to 63 are stretched to some extent during tearing, the widths W1 to W3 of the thin portions 61 to 63 shown in FIG. 2 may be less than those shown in FIG. 6. The widths in the second direction D2 of the openings 74 and 75 are, for example, the same. The depths in the second direction D2 of the notches 73 and 76 are, for example, less than any of the width W1 and the widths of the openings 74 and 75.

In the example of FIG. 6, the first spring portion 31A and the first arm 81A are arranged in the first direction D1. In addition, the thin portions 61 to 63, the notches 73 and 76 and the openings 74 and 75 are arranged in the second direction D2. In the present embodiment, the first spring portion 31A and the first arm 81A are an example of a "first portion" and a "second portion". Furthermore, in the present embodiment, the first spring portion 31A and the first arm 81A (frame 8) before tearing are an example of a "plate material".

Figure 7:
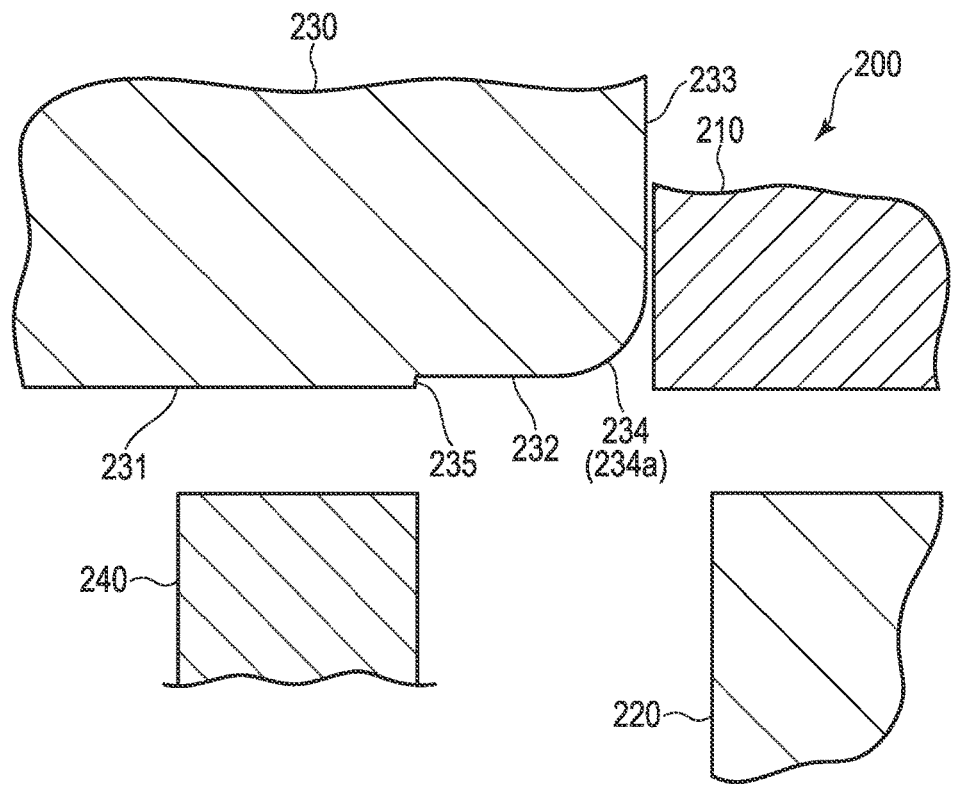
FIG. 7 is a schematic cross-sectional view of a tearing apparatus in the first embodiment.

FIG. 7 is a schematic cross-sectional view of the tearing apparatus 200 in the present embodiment. The tearing apparatus 200 includes an upper pad 210 of an upper die, a die 220 of a lower die opposed to the upper pad 210, a punch 230 adjacent to the upper pad 210, and a lower pad 240 opposed to the punch 230.

The punch 230 is supported movably along an upward/downward direction in FIG. 7. The lower pad 240 is elastically supported by an urging member such as a coil spring. When the punch 230 moves down toward the lower pad 240 and presses the lower pad 240, the lower pad 240 retreats downward against an urging force.

The punch 230 has a punch surface 231 opposed to the lower pad 240, a guide surface 232 overhanging toward the upper pad 210 with respect to the lower pad 240, an end surface 233 opposed to the upper pad 210, and a corner portion 234 between the guide surface 232 and the end surface 233. In the present embodiment, the guide surface 232 is located more upward in the drawing (in a direction away from the lower pad 240) than the punch surface 231. Accordingly, a step 235 is formed between the punch surface 231 and the guide surface 232. In addition, the corner portion 234 in the present embodiment has an R portion 234a having a cross section rounded in an arc shape.

Figure 8:
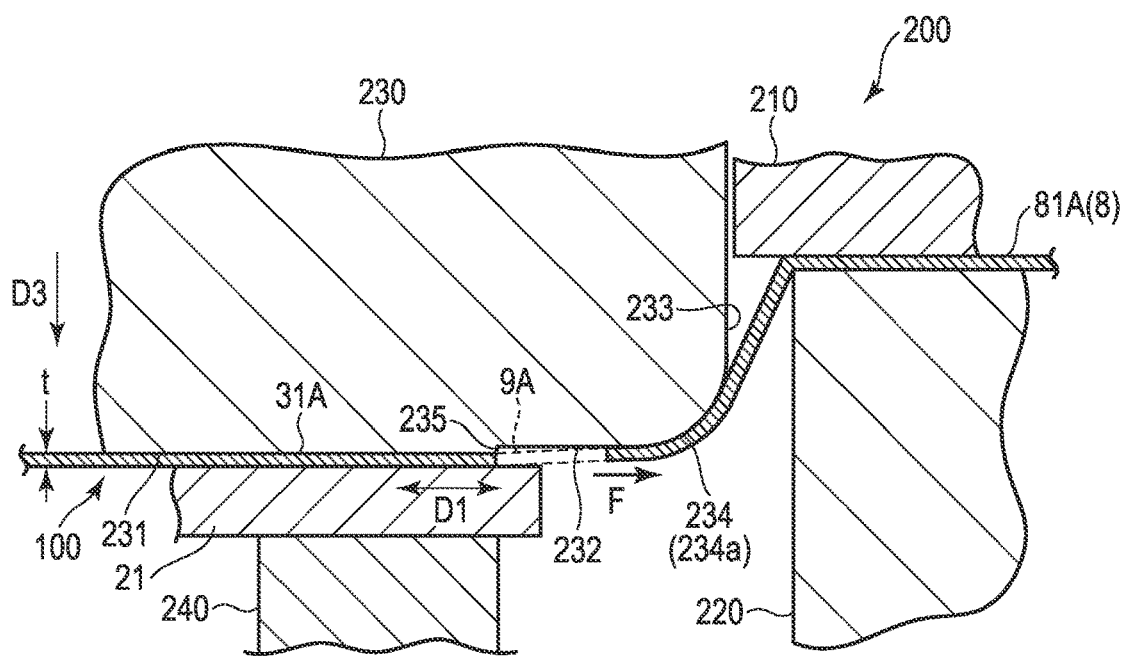
FIG. 8 is a schematic cross-sectional view for explaining a tearing method using the tearing apparatus.

FIG. 8 is a schematic cross-sectional view for explaining a plate material tearing method using the tearing apparatus 200. The chain blank 100 shown in FIG. 3 is arranged on the die 220 and the lower pad 240. In this state, the frame 8 (first arm 81A) is sandwiched between the upper pad 210 and the die 220, and the first spring portion 31A and the first plate 21 are sandwiched between the punch 230 and the lower pad 240. The first fracture portion 9A is located close to the step 235, and is at least partly opposed to the guide surface 232. Since the step 235 is provided, a part of the first fracture portion 9A which is opposed to the guide surface 232 is not held by the punch 230.

Note that, although not shown in the cross section of FIG. 8, the second arm 81B is also sandwiched between the upper pad 210 and the die 220 similarly to the first arm 81A, and the second spring portion 31B is also sandwiched between the punch 230 and the lower pad 240 similarly to the first spring portion 31A. In addition, positioning pins are inserted in the pin holes 82A and 82B shown in FIG. 3.

In the example of FIG. 8, the punch 230 is pressed in a third direction D3 shown in the drawing, and the first spring portion 31A is located more downward than the first arm 81A. While the punch 230 is pressed, the first arm 81A is slid along the R portion 234a and the guide surface 232 and is bent along the R portion 234a. Close to the guide surface 232, a tensile force F substantially parallel to the first direction D1 (in-plane direction of the first spring portion 31A and the first arm 81A) acts on the first arm 81A. When the punch 230 is sufficiently moved down, the tensile force F is increased, and eventually the first fracture portion 9A is fractured. In the shape of the first fracture portion 9A shown in FIG. 6, a stress applied to the thin portions 61 and 63 increases, and the first fracture portion 9A can be efficiently fractured.

Here, the thicknesses of the first spring portion 31A and the first arm 81A will be defined as t as shown in FIG. 8. According to experiments by inventors, when the thickness t of each of the first spring portion 31A and the first arm 81A formed of SUS 304 is greater than or equal to 15 μm but less than or equal to 100 μm, if the widths W1 to W3 of the thin portions 61 to 63 shown in FIG. 6 are less than twice the thickness t, the thin portions 61 to 63 are stretched a lot during tearing, and if the widths W1 to W3 are greater than four times the thickness t, the thin portions 61 to 63 are less easily torn. Therefore, when the thickness t of each of the first spring portion 31A and the first arm 81A is greater than or equal to 15 μm but less than or equal to 100 μm, the widths W1 to W3 should preferably be greater than or equal to twice the thickness t but less than or equal to four times the thickness t.

In addition, as shown in FIG. 6, the widths in the first direction D1 of the openings 74 and 75 will be defined as W, the distance in planar view between the fracture line L and the end surface 233 of the punch 230 will be defined as D. In the example of FIG. 6, the width W and the distance D are substantially the same.

Figure 9:
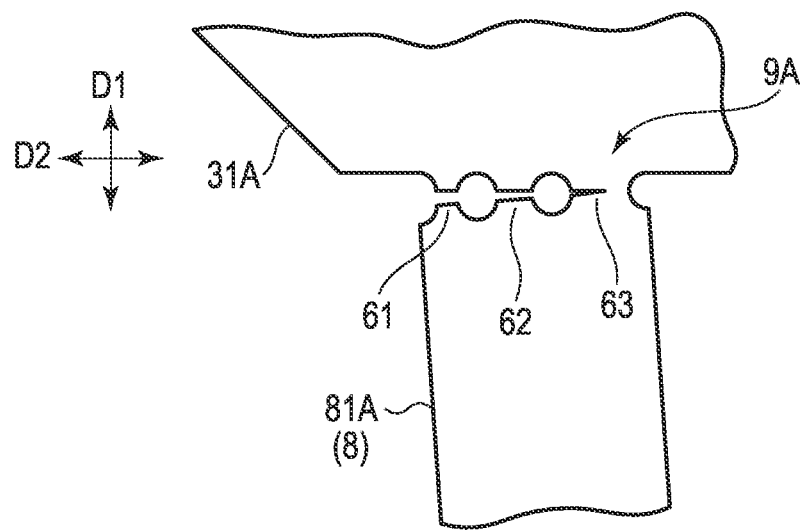
FIG. 9 is a schematic plan view of an example of a state where the fracture portion is torn.
Figure 10:
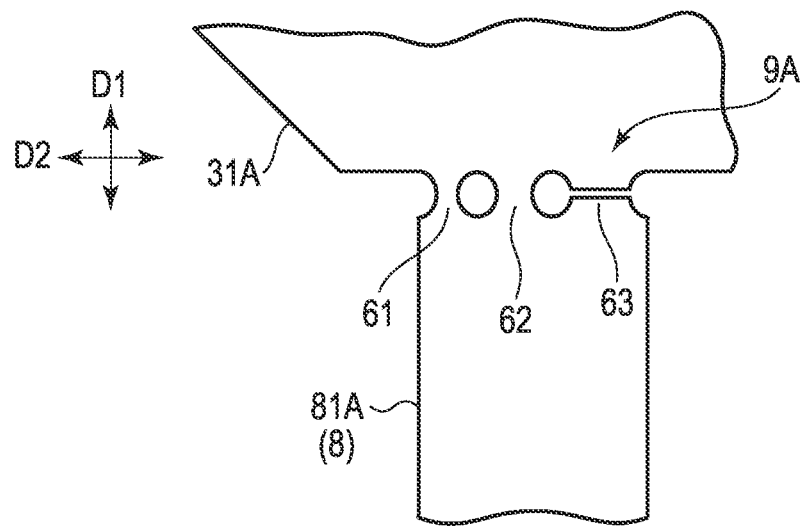
FIG. 10 is a schematic plan view of another example of the state where the fracture portion is torn.

FIGS. 9 and 10 are plan views schematically showing a state where the first fracture portion 9A is torn by the tensile force F. The example of FIG. 9 corresponds to a case where the first arm 81A (frame 8) is loosely sandwiched between the upper pad 210 and the die 220. In this case, the first arm 81A can rotate in a plane including the respective directions D1 and D2. Therefore, when the punch 230 is pressed, the thin portion 61 having a small width is stretched and the first arm 81A is slanted in the plane, and the thin portion 61 is fractured first, the thin portion 62 is fractured second, and the thin portion 63 is fractured last.

On the other hand, the example of FIG. 10 corresponds to a case where the first arm 81A (frame 8) is firmly sandwiched between the upper pad 210 and the die 220. In this case, since the first arm 81A does not rotate in the plane including the respective directions D1 and D2, the thin portion 63 having a large width and stretched little is fractured first, the thin portion 62 is fractured second, and the thin portion 61 is fractured last.

For example, in order to determine which of the methods of FIGS. 9 and 10 to use for tearing the first fracture portion 9A, one of which can produce an excellent fracture surface after tearing may be selected according to the material qualities of the first spring portion 31A and the first arm 81A, the widths W1 to W3 of the thin portions 61 to 63, and the like.

Note that the configuration described regarding the first spring portion 31A and the first arm 81A with reference to FIGS. 6 to 10 can also be applied to the second spring portion 31B and the second arm 81B.

According to the present embodiment described above, since the fracture portions 9A and 9B are torn mainly by the tensile force F in the in-plane direction (first direction D1) while the tearing of the plate material (frame 8 and spring portions 31A and 31B), bending hardly acts on the fracture portions 9A and 9B. Therefore, occurrence of burrs after tearing can be suppressed. Since the thin portions 61 to 63 are provided in the fracture portions 9A and 9B, tearing can be easily carried out, and occurrence of particles after tearing can be suppressed.

If the thin portions 61 to 63 and the openings 74 and 75 are not provided in the fracture portions 9A and 9B, in order to make the frame 8 and the spring portions 31A and 31B easy to tear, the widths of the entire fracture portions 9A and 9B need to be reduced. In this case, the suspension 1 in the chain blank 100 swings easily with respect to the frame 8 and is not stable. On the other hand, when the thin portions 61 to 63 and the openings 74 and 75 are provided in the fracture portions 9A and 9B, the widths of the fracture portions 9A and 9B can be increased while ease of tearing is maintained. Accordingly, the suspension 1 is stably supported by the frame 8. Furthermore, the position of the fracture line L is also stabilized by providing the thin portions 61 to 63 and the openings 74 and 75.

In the tearing apparatus 200 according the present embodiment, since the guide surface 232 where a part of the punch 230 is overhung with respect to the lower pad 240 is formed, even if the pitch of the suspension 1 is slightly changed by heat influence during the material joining of the chain blank 100, the change in pitch can be absorbed. Furthermore, in the tearing apparatus 200, high accuracy is not required for a clearance between the punch 230 and the die 220. Therefore, the cost of the tearing apparatus 200 can be suppressed.

When the thin portions 61 to 63 and the openings 74 and 75 are provided in the fracture portions 9A and 9B, a load which should be applied to the fracture portions 9A and 9B by the tearing apparatus 200 is reduced. Accordingly, the miniaturization and energy saving of the tearing apparatus 200 are facilitated.

As the thicknesses of the spring portions 31A and 31B and the frame 8 increase, vibration during tearing increases. For example, when these have a thickness of greater than or equal to 35 µm, strong vibration occurs. By this vibration, the bending angles of the respective parts in the suspension 1 after tearing may be changed, or the product may be displaced inside the dies and scratches may occur. In addition, the spring portions 31A and 31B and the frame 8 cannot be held during tearing, and this may cause a problem with the fracture position, or the like. In order to prevent this, the load for holding the spring portions 31A and 31B and the frame 8 needs to be increased, and high rigidity is required for the respective elements of the tearing apparatus 200. Furthermore, since the respective elements in the tearing apparatus 200 loses balance easily by vibration, the frequency of maintenance needs to be increased.

Meanwhile, a countermeasure to suppress vibration during tearing which is conceived is making all the thin portions 61 to 63 sufficiently thin. In this case, however, the suspension 1 is more easily vibrated during the transportation of the chain blank 100, and this may cause deformation of the suspension 1.

On the other hand, when the widths W1 to W3 of the thin portions 61 to 63 are made different from each other as in the present embodiment, as shown in FIGS. 9 and 10, the thin portions 61 to 63 are fractured in order. In this case, vibration during tearing is reduced, and the above problems caused by this vibration can be suppressed. In addition, as compared with a case where all the thin portions 61 to 63 are made thin, the vibration of the suspension 1 during the transportation of the chain blank 100 can also be suppressed.

In a case where the suspension 1 is manufactured using the plate material tearing method according to the present embodiment, the first end side SA and the second end side SB of the suspension 1 have the shape shown in FIG. 2. From another point of view, it is possible to apply the plate material tearing method according to the present embodiment to the manufacturing of the suspension 1 by forming the suspension 1 in the shape of FIG. 2. Accordingly, occurrence of burrs and particles during manufacturing can be suppressed, and the yield of the suspension 1 can be improved.

Note that the shapes of the fracture portions 9A and 9B are not limited the shape shown in FIG. 6. In the following second to fifth embodiments, other shapes applicable to the fracture portions 9A and 9B will be illustrated.

Second Embodiment

Figure 11:
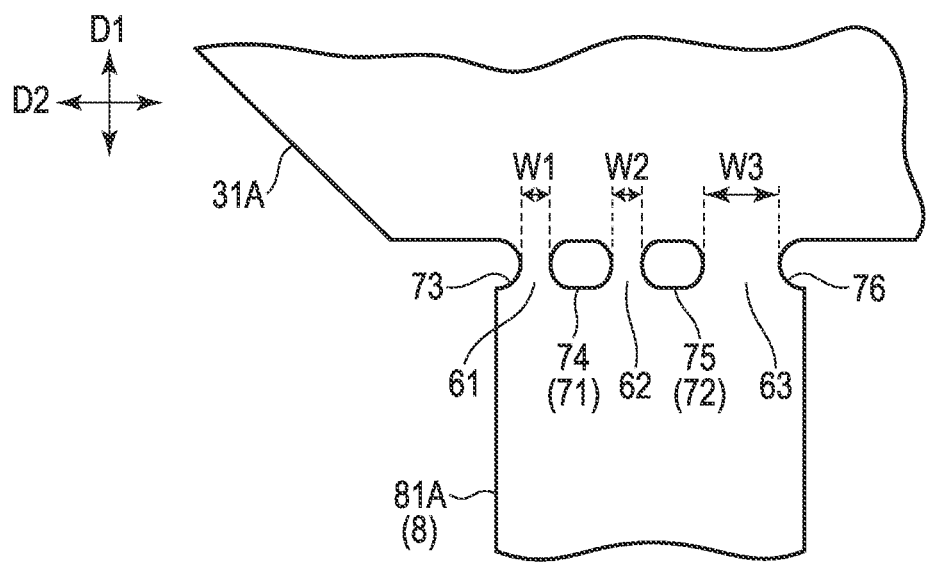
FIG. 11 is a schematic plan view of a fracture portion according to the second embodiment.

FIG. 11 is a schematic plan view of the first fracture portion 9A according to the second embodiment. In the example of this drawing, the width W2 of the second thin portion 62 is less than the case of FIG. 6. The width W2 is, for example, the same as the width W1 of the first thin portion 61. A similar shape can also be applied to the second fracture portion 9B.

For example, the chain blank 100 having these fracture portions 9A and 9B is arranged in the tearing apparatus 200 such that the arms 81A and 81B can rotate in the plane including the respective directions D1 and D2 similarly to FIG. 9, and the punch 230 is moved down. At this time, since the widths W1 and W2 are sufficiently less than the width W3, the arms 81A and 81B rotate more easily than the case of FIG. 6.

Third Embodiment

Figure 12:
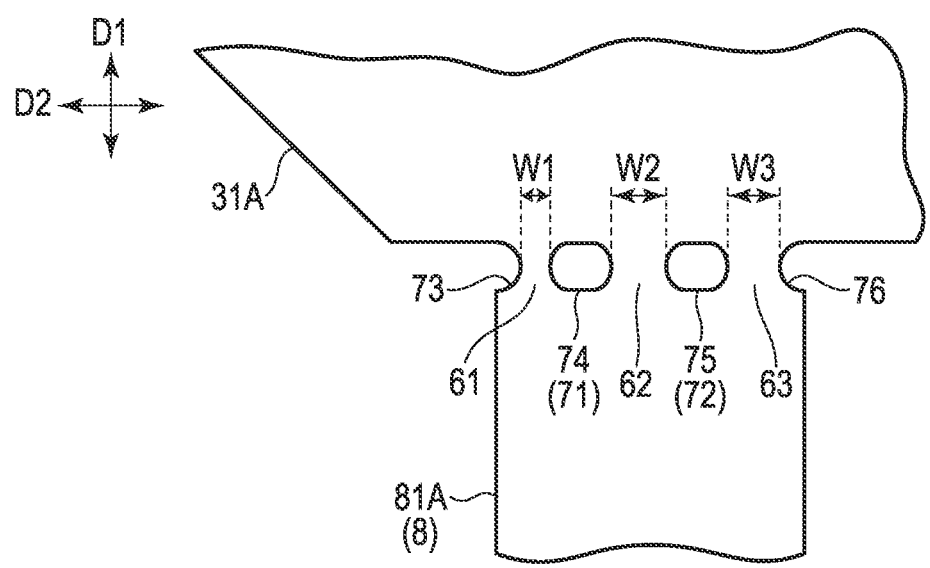
FIG. 12 is a schematic plan view of a fracture portion according to the third embodiment.

FIG. 12 is a schematic plan view of the first fracture portion 9A according to the third embodiment. In the example of this drawing, the width W2 of the second thin portion 62 is greater than the case of FIG. 6. The width W2 is, for example, the same as the width W3 of the third thin portion 63. A similar shape can also be applied to the second fracture portion 9B.

When the chain blank having these fracture portions 9A and 9B is torn by a similar method to FIG. 9, the arms 81A and 81B rotate less easily than the case of the fracture portions 9A and 9B having the shape of FIG. 6.

Fourth Embodiment

Figure 13:
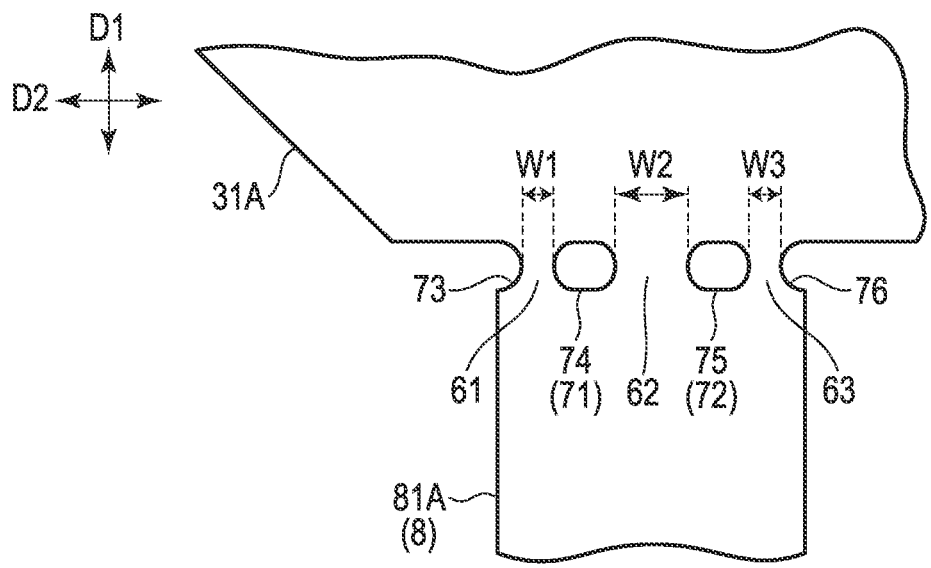
FIG. 13 is a schematic plan view of a fracture portion according to the fourth embodiment.

FIG. 13 is a schematic plan view of the first fracture portion 9A according to the fourth embodiment. In the example of this drawing, the width W2 of the second thin portion 62 is greater than either of the width W1 of the first thin portion 61 and the width W3 of the third thin portion 63. In addition, the width W1 and the width W3 are the same. A similar shape can also be applied to the second fracture portion 9B.

When the chain blank having these fracture portions 9A and 9B is torn by a similar method to FIG. 9, since the fracture portions 9A and 9B have a bisymmetrical shape with respect to the center in the second direction D2, the arms 81A and 81B rotate less easily than the case of the fracture portions 9A and 9B having the shape of FIG. 6.

Fifth Embodiment

Figure 14:
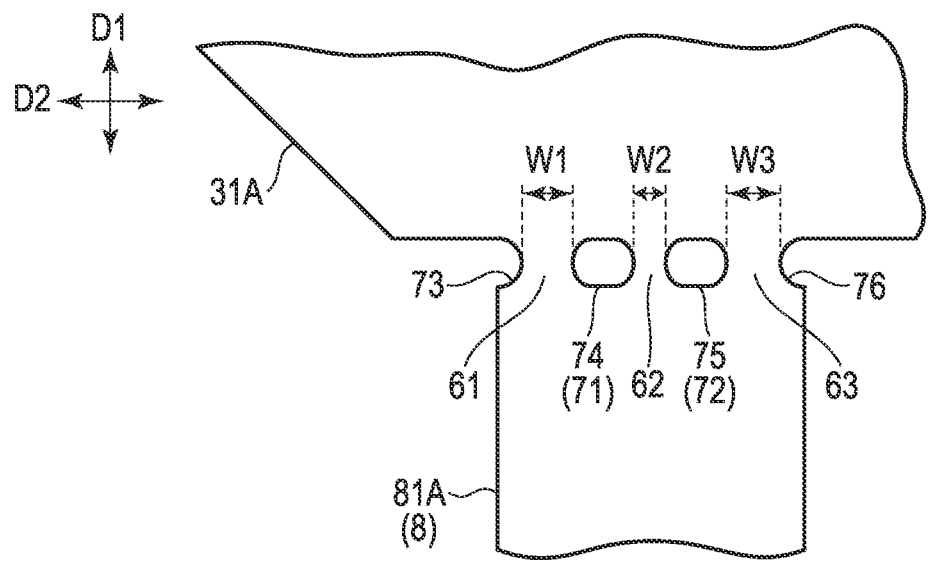
FIG. 14 is a schematic plan view of a fracture portion according to the fifth embodiment.

FIG. 14 is a schematic plan view of the first fracture portion 9A according to the fifth embodiment. In the example of this drawing, the width W2 of the second thin portion 62 is less than either of the width W1 of the first thin portion 61 and the width W3 of the third thin portion 63. In addition, the width W1 and the width W3 are the same. A similar shape can also be applied to the second fracture portion 9B.

When the chain blank 100 having these fracture portions 9A and 9B is torn by a similar method to FIG. 9, similarly to the fourth embodiment, the arms 81A and 81B rotate less easily. When the widths W1 and W3 of the thin portions 61 and 63 at both ends are greater than the width W2 of the second thin portion 62 at the center as in the present embodiment, the effect of rotation suppression becomes more significant.

The fracture portions 9A and 9B disclosed in the above first to fifth embodiments can be appropriately used depending on whether or not to rotate the arms 81A and 81B during tearing. The fracture portions 9A and 9B disclosed in these embodiments can produce various other favorable effects. In the embodiments, the number of thin portions provided in each of the fracture portions 9A and 9B is not limited to three but may be two or greater than or equal to four.

The configuration of the tearing apparatus 200 is not limited to the configuration shown in FIGS. 7 and 8. In the following sixth and seventh embodiments, other shapes applicable to the tearing apparatus 200 will be illustrated.

Sixth Embodiment

Figure 15:
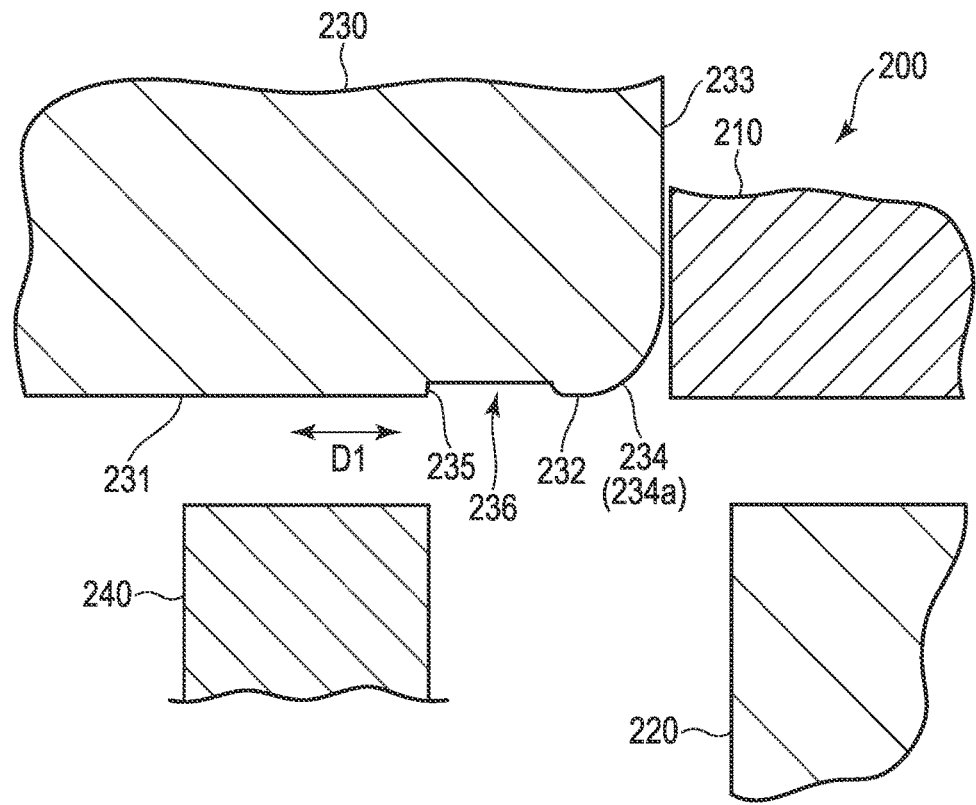
FIG. 15 is a schematic cross-sectional view of a tearing apparatus of the sixth embodiment.

FIG. 15 is a schematic cross-sectional view of the tearing apparatus 200 according to the sixth embodiment. In the example of this drawing, the punch surface 231 and the guide surface 232 are located at the same height. A concave portion 236 is formed between the punch surface 231 and the guide surface 232. According to this configuration, the tensile force F applied to the fracture portions 9A and 9B during tearing as shown in FIG. 8 can be made parallel to the first direction D1.

Seventh Embodiment

Figure 16:
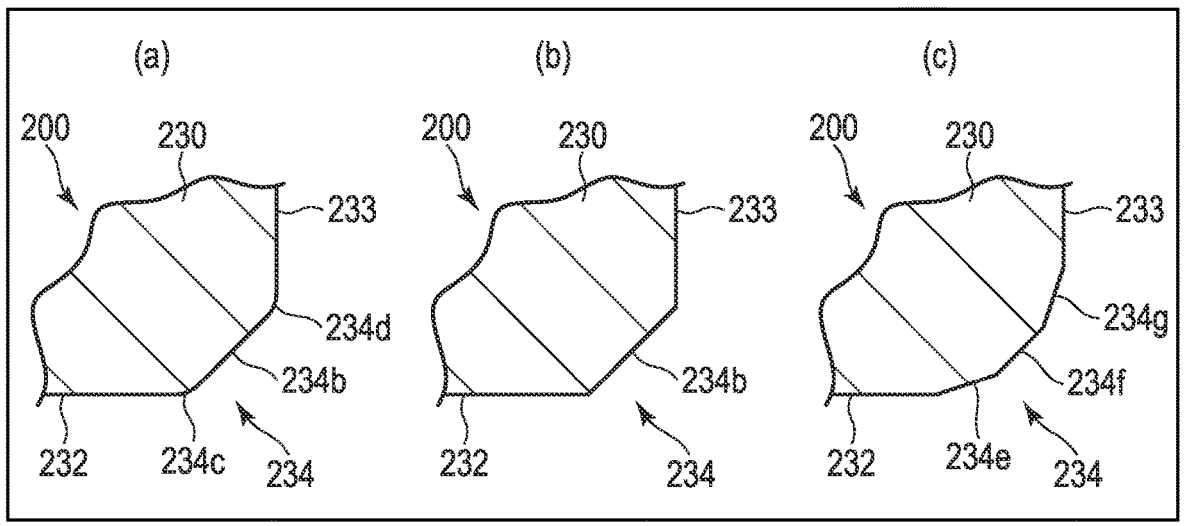
FIG. 16 is a schematic cross-sectional view of a corner portion of a punch provided in a tearing apparatus according to the seventh embodiment.

FIGS. 16(a), 16(b) and 16(c) are schematic cross-sectional views of the corner portion 234 of the punch 230 provided in the tearing apparatus 200 according to the seventh embodiment. The corner portion 234 shown in FIG. 16(a) has an inclined surface 234b inclined with respect to the guide surface 232 and the end surface 233, a first R portion 234c between the inclined surface 234b and the guide surface 232, and a second R portion 234d between the inclined surface 234b and the end surface 233.

The corner portion 234 shown in FIG. 16(b) has the inclined surface 234b similarly to the example of FIG. 16(a) but does not have the R portions 234c and 234d.

The corner portion 234 of FIG. 16(c) has a first inclined surface 234e, a second inclined surface 234f and a third inclined surface 234g which are inclined with respect to the guide surface 232 and the end surface 233. Angles which these inclined surfaces 234e to 234g form with the guide surface 232 and the end surface 233 are different from each other. R portions may be provided between the guide surface 232 and the first inclined surface 234e, between the first inclined surface 234e and the second inclined surface 234f, between the second inclined surface 234f and the third inclined surface 234g, and between the third inclined surface 234g and the end surface 233.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A plate material comprising a first portion, a second portion, and a fracture portion connecting the first portion and the second portion, the plate material being separable into the first portion and the second portion by tearing the fracture portion, wherein:
   the first portion and the second portion are arranged in a first direction,
   the fracture portion has a plurality of thin portions arranged in a second direction crossing the first direction, and an opening between two adjacent thin portions among the thin portions,
   widths in the second direction of the thin portions are different from each other, and
   a width in the second direction of the opening is greater than a width in the second direction of one of the thin portions and is less than a width in the second direction of another of the thin portions.

2. The plate material of claim 1, wherein:
   the fracture portion has a first thin portion, a second thin portion, and a third thin portion arranged in the second direction, and
   the widths in the second direction of the thin portions increase in an order of the first thin portion, the second thin portion, and the third thin portion.

3. The plate material of claim 1, wherein:
   the fracture portion has a first thin portion, a second thin portion, and a third thin portion arranged in the second direction, and
   a width in the second direction of the second thin portion is less than widths in the second direction of the first thin portion and the third thin portion.

4. The plate material of claim 1, wherein:
   the fracture portion has a first thin portion, a second thin portion, and a third thin portion arranged in the second direction, and
   a width in the second direction of the second thin portion is greater than widths in the second direction of the first thin portion and the third thin portion.

5. The plate material of claim 1, wherein:
   the fracture portion has a plurality of openings, each of the openings being provided between two adjacent thin portions among the thin portions, and
   the openings have same widths in the second direction.

6. The plate material of claim 1, wherein:
   the first portion comprises a part of a suspension supporting an element for writing data to a disk provided in a disk drive and reading data from the disk, and
   the second portion comprises a frame forming a chain blank by coupling a plurality of the suspensions together.

7. A plate material tearing method of tearing a plate material comprising a first portion, a second portion, and a fracture portion connecting the first portion and the second portion, the first portion and the second portion being arranged in a first direction, the fracture portion having a plurality of thin portions arranged in a second direction crossing the first direction and an opening between two adjacent thin portions among the thin portions, widths in the second direction of the thin portions being different from each other, and a width in the second direction of the opening being greater than a width in the second direction of one of the thin portions and being less than a width in the second direction of another of the thin portions, the method comprising:

arranging the first portion between a pad retreatable against an urging force and a punch;

sandwiching the second portion between an upper die and a lower die; and fracturing the fracture portion so as to separate the plate material into the first portion and the second portion by applying a tensile force in the first direction to the fracture portion by pressing the pad by the punch.

8. A suspension for supporting an element for writing data to a disk provided in a disk drive and reading data from the disk, the suspension comprising:

a base plate;

a load beam including a rigid portion and a pair of spring portions connecting the rigid portion and the base plate; and a flexure connected to the load beam and having a tongue for mounting the element, wherein:

the pair of spring portions have a first end side and a second end side in a width direction of the suspension, respectively, each of the first end side and the second end side has a plurality of thin portions arranged in a longitudinal direction of the suspension, and a concave portion between two adjacent thin portions among the thin portions, widths in the longitudinal direction of the thin portions are different from each other, and a width in the longitudinal direction of the concave portion is greater than a width in the longitudinal direction of one of the thin portions and is less than a width in the longitudinal direction of another of the thin portions.

* * * * *